United States Patent
Ravi et al.

(10) Patent No.: US 10,876,029 B2
(45) Date of Patent: Dec. 29, 2020

(54) ANNULAR PRESSURE BUILDUP MITIGATION USING ACID SWELLABLE POLYMER SYSTEM

(71) Applicant: Halliburton Energy Services, Inc., Houston, TX (US)

(72) Inventors: Krishna M. Ravi, Kingwood, TX (US); Vaishali Mishra, Pune (IN); Ganesh S. Pangu, Maharashtra (IN); Sandip Patil, Pune (IN); Sunita Sameer Kadam, Pune (IN); Rahul Chandrakant Patil, Pune (IN)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/074,414

(22) PCT Filed: Sep. 19, 2017

(86) PCT No.: PCT/US2017/052231
§ 371 (c)(1),
(2) Date: Jul. 31, 2018

(87) PCT Pub. No.: WO2019/059890
PCT Pub. Date: Mar. 28, 2019

(65) Prior Publication Data
US 2020/0131424 A1    Apr. 30, 2020

(51) Int. Cl.
*C09K 8/44* (2006.01)
*C04B 26/06* (2006.01)
(Continued)

(52) U.S. Cl.
CPC .............. *C09K 8/44* (2013.01); *C04B 26/06* (2013.01); *C09K 8/40* (2013.01); *C09K 8/424* (2013.01);
(Continued)

(58) Field of Classification Search
CPC . C09K 8/44; C09K 8/40; C09K 8/424; C09K 8/035; C09K 8/04; C09K 8/18
(Continued)

(56) References Cited

U.S. PATENT DOCUMENTS

| 3,181,612 A | * | 5/1965 | West ...................... C09K 8/502 166/283 |
| 6,675,898 B2 | | 1/2004 | Staudt |

(Continued)

FOREIGN PATENT DOCUMENTS

WO    2016053237 A1    4/2016

OTHER PUBLICATIONS

Patent Cooperation Treaty, International Search Report and Written Opinion, PCT Appln. No. PCT/US2017/052231, dated May 28, 2018.

(Continued)

*Primary Examiner* — Angela M DiTrani Leff
(74) *Attorney, Agent, or Firm* — McGuirewoods, LLP (57) ABSTRACT

Compositions, methods, and systems for mitigating annular pressure buildup in a wellbore. A method comprises introducing a spacer fluid into an annulus of the wellbore, wherein the spacer fluid comprises an aqueous base fluid, an acid swellable polymer, and a hydrolysable ester. The method further comprises allowing or causing to allow at least a portion of the spacer fluid to remain in the annulus; and allowing or causing to allow a temperature to increase in the annulus to the temperature sufficient to hydrolyze the hydrolysable ester; wherein hydrolysis of the hydrolysable ester produces an acid; wherein the acid reacts with the acid swellable polymer to produce a salt; and wherein the produced salt has a thermal expansion coefficient less than that of the aqueous base fluid.

10 Claims, 3 Drawing Sheets

(51) Int. Cl.
*C09K 8/40* (2006.01)
*C09K 8/42* (2006.01)
*E21B 33/14* (2006.01)
*E21B 41/00* (2006.01)
*C04B 103/00* (2006.01)

(52) U.S. Cl.
CPC .............. *E21B 33/14* (2013.01); *E21B 41/00* (2013.01); *C04B 2103/0049* (2013.01)

(58) Field of Classification Search
USPC ....................................................... 166/310
See application file for complete search history.

(56) References Cited

U.S. PATENT DOCUMENTS

| | | |
|---|---|---|
| 7,441,599 B2 | 10/2008 | Hermes et al. |
| 8,066,074 B2 | 11/2011 | Maskos et al. |
| 2006/0213663 A1 | 9/2006 | Vargo, Jr. et al. |
| 2008/0115692 A1* | 5/2008 | Welton ................... C09K 8/518 106/122 |
| 2011/0094746 A1* | 4/2011 | Allison ................... C09K 8/424 166/308.5 |
| 2011/0120716 A1 | 5/2011 | Williams et al. |
| 2014/0162910 A1* | 6/2014 | Braley ................... C09K 8/516 507/120 |
| 2015/0013988 A1 | 1/2015 | Ravi et al. |
| 2017/0247983 A1* | 8/2017 | Funkhouser ........... C09K 8/032 |
| 2018/0169445 A1* | 6/2018 | Rodrigues ................ A61K 8/06 |

OTHER PUBLICATIONS

Richard F. Vargo Jr., Mike Payne, Ronnie Faul, John LeBlanc, and James E. Griffith, Practical and Successful Prevention of Annular Pressure Buildup on the Marlin Project, Sep. 2003, SPE 85113, Society of Petroleum Engineers (SPE).

* cited by examiner

ANNULAR PRESSURE BUILDUP MITIGATION USING ACID SWELLABLE POLYMER SYSTEM

TECHNICAL FIELD

The present disclosure relates to the use of a spacer fluid that mitigates annular pressure buildup, and more particularly, to a spacer fluid comprising an acid swellable polymer system that utilizes the temperature-dependent hydrolytic cleavage of an ester to consume a molecule of the more thermally expansive water and produce an acid which reacts with an acid swellable polymer to produce a less thermally expansive salt that forms a non-dissolvable hydrogel absorbing water and resulting in a less thermally expansive solid that mitigates the annular pressure buildup occurring from increasing annular temperature.

BACKGROUND

During production, produced oil and gas is transported through the wellbore. The produced oil and gas transfers heat through the casing and into the annulus. This heat transfer may increase the annular pressure due to, amongst other reasons, the thermal expansion of fluids trapped in the annular space. Examples of these trapped fluids may include portions of drilling fluids or spacer fluids that were not sufficiently displaced from the annulus. This increase in annular pressure is known as annular pressure buildup, and may be more pronounced in an annuli where the annular volume is fixed, for instance, in deep water wells where the annulus may be closed or any other well where the annulus is trapped to isolate fluids from areas outside the annulus. Annular pressure buildup may cause damage to the cement sheath, the casing, tubulars, and any other equipment exposed to the increased annular pressure.

Current methods used in the field for mitigating annular pressure buildup include the use of a syntactic foam wrapping on the casing, the installation of vacuum insulated tubing to limit heat transfer, the placing of nitrified spacer fluids above the cement in the annulus, the placing of rupture disks in an outer casing string, the use of intentional "shortfalls" in the primary cementing operation such as designing the top of the cement column in an annulus to be short of the previous casing shoe, the use of hollow spheres, and the like. These methods may have drawbacks in some applications. For instance, the syntactic foam can cause flow restrictions during primary cementing of the casing within the wellbore. Moreover, the syntactic foam may detach from the casing and/or become damaged as the casing is installed. Vacuum insulated tubing can be expensive, unreliable, and logistically troublesome to install. The nitrified spacer fluids may have logistical difficulties (e.g., limited room for the accompanying surface equipment, pressure limitations on the well bore, and the typical high expenses related thereto). Additionally, there can be difficulties in supplying the proper equipment for pumping the nitrified spacer. The rupture disks can fail and compromise the casing string such that well bore operations may need to be stopped resulting in increased non-productive time. The designed cementing "shortfalls" can be difficult to install correctly due to poor fluid displacement and the cement channeling up to a casing shoe. Problems with the hollow spheres can include premature failure and the inability to withstand repeated changes in pressure/temperature.

As such, the inability to mitigate or relieve annular pressure buildup can result in damage to the well equipment and the wellbore. Further, this damage can result in the well having to be shut-in and the operation may incur a significant loss of operational time and resources.

BRIEF DESCRIPTION OF THE DRAWINGS

Illustrative examples of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different examples may be implemented.

DETAILED DESCRIPTION

The present disclosure relates to the use of a spacer fluid that mitigates annular pressure buildup, and more particularly, to a spacer fluid comprising an acid swellable polymer system that utilizes the temperature-dependent hydrolytic cleavage of an ester to consume a molecule of the more thermally expansive water and produce an acid which reacts with an acid swellable polymer to produce a less thermally expansive salt that forms a non-dissolvable hydrogel absorbing water and resulting in a less thermally expansive solid that mitigates the annular pressure buildup occurring from increasing annular temperature.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Examples of the methods and systems described herein relate to the use of spacer fluids comprising an acid swellable polymer and a hydrolysable ester in subterranean operations. The acid swellable polymer and hydrolysable ester may be used to reduce the annular pressure buildup in aqueous spacer fluids. One of the many potential advantages to these methods and systems is that the hydrolysis reaction is temperature-dependent and thus, production of the acid needed to produce the salt of the acid swellable polymer does not occur until sufficient heat is transferred through the casing to the annulus. As such, the mitigation system is not initiated until the conditions necessary for annular pressure buildup start to occur. Another potential advantage of these methods and systems is that there is a net reduction in the overall water in the system as some of the water is consumed during the hydrolysis reaction. Yet a further advantage is that the acid swellable polymer is cross-linked forming a non-dissolvable hydrogel which absorbs water and is a solid with a thermal expansion coefficient less than that of the water in the aqueous spacer fluid. Yet another potential advantage is that the consumed and absorbed water results in additional thermal expansion space for the hydrogel formed from the acid swellable polymer. One more additional advantage is that the concentration of the acid swellable polymer and hydrolysable ester may be very low resulting in a cost-effective spacer fluid solution for annular pressure buildup.

Generally, the acid swellable polymers described herein may form a salt in the presence of an acid and swell forming a hydrogel that absorbs water. By "swell," "swelling," or "swellable" it is meant that the acid swellable polymer increases its volume. Preferably, the acid swellable polymer will be an acid that can form a salt upon exposure to organic acids, such as those produced from the hydrolytic cleavage of hydrolysable esters. In all examples, the acid swellable polymer comprises an amine functional group capable of reacting with an acidic functional group to form a salt. In all examples, the acid swellable polymer is cross-linked to such a degree that it does not dissolve in water and instead absorbs water through hydrogen bonding to its structure resulting in the formation of a hydrogel that is less thermally expansive than the liquid water.

In all examples, the acid swellable polymer is a copolymer, and monomer pairs may be used to make the example acid swellable polymer. Examples of the monomers do not include fluoro-based monomers. Generally, examples of the monomers used in examples of the acid swellable polymer include, but are not limited to, mono-, di-, and trivinyl monomers. Specific examples of monovinyl monomers include, but are not limited to, alkyl acrylates, alkyl methacrylates, cyclohexyl acrylates, cyclohexyl methacrylates, aryl acrylates, aryl methacrylates, aminoalkyl acrylates, aminoalkyl methacrylates, alkyl vinyl ethers, styrene, acrylonitrile, 2-vinyl pyridine, 4-vinyl pyridine, and vinyl acetate. Specific examples of divinyl monomers include, but are not limited to, alkane diol diacrylates, alkane diol dimethacrylates, alkene glycol diacrylates, alkene glycol dimethacrylates, alkane diol divinyl ethers, alkene glycol divinylethers, divinylbenzene, allyl methacrylate, and allyl acrylate. Specific examples of trivinyl monomers include, but are not limited to, triacrylates (e.g., trimethylolpropane triacrylate), trimethacrylates (e.g., trimethylolpropane trimethacrylate). Examples of the acid swellable polymers may include any combination of any of the preceding monomers. In some examples, a monovinyl monomer may be combined with a divinyl monomer to make the acid swellable polymer. In some examples, monovinyl monomers can be copolymerized with multivinyl monomers such as divinyl monomers or trivinyl monomers to yield cross-linked polymers. In all examples, at least one monomer of the monomer pair should comprise an amine functional group. In all examples, the acid swellable polymer is cross-linked to a sufficient degree that the salt of the acid swellable polymer is not dissolvable in the aqueous base fluid of the spacer fluid. With the benefit of this disclosure, one of ordinary skill in the art will be readily able to select the monomers necessary to synthesize a desired acid swellable polymer for a given application.

In an illustrative example, a cross-linked acid swellable polymer comprising N, N-dimethylaminoethyl methacrylate (hereafter "DMAEMA") and styrene was synthesized in a bulk polymerization technique using azobisisobutyronitrile (hereafter "ARM") as a free radical initiator. One reason for selecting DMAEMA is that it contains an amino functional group that can interact with organic acids and form salts. DMAEMA has a tertiary amine group that is stable in nature. Ethylene glycol dimethacrylate (hereafter "EGDMA") was used as the cross-linker, and it is miscible with the DMAEMA and styrene monomer.

The co-monomer composition of the acid swellable polymer may be altered to vary the hydrophilicity of the acid swellable polymer. To achieve this, various comonomer(s) can be incorporated. In several embodiments, a monovinyl monomer may be combined with a divinyl monomer or trivinyl monomer to make the example acid swellable polymer.

In one example, a monomer pair includes styrene and DMAEMA, with EGDMA added as a cross-linker. Various substitutions may be made to form different monomer pairs. In an example, styrene may be substituted with methyl methacrylate (hereafter "MMA"), polypropylene, or other vinyl monomers. In another example, DMAEMA may be substituted with other monomers containing amino groups. In some examples, EGDMA may be substituted with other divinyl and trivinyl monomers as a cross-linker depending on the extent of cross-linking required.

In an exemplary embodiment, the concentration of styrene may range from about 5 mole % to about 25 mole % with a preferred range of about 15 mole % to about 20 mole %, the amount of DMAEMA may range from about 75 mole % to about 95 mole % with a preferred range of about 80 mole % to about 85 mole %, and the amount of EGDMA or other cross-linker may range from about 1 mole % to about 5 mole % with a preferred amount of about 3 mole %.

The acid swellable polymer may be included in the spacer fluid in an amount sufficient to reduce annular pressure buildup. That is, the acid swellable polymer should be present in the spacer fluid such that the annular pressure buildup is mitigated relative to the same or similar system that does not utilize an acid swellable polymer. The concentration of the acid swellable polymer in the spacer fluid may range from about 0.5% (v/v) of the spacer fluid to about 30% (v/v) of the spacer fluid. The concentration of the acid swellable polymer in the spacer fluid may range from any lower limit to any upper limit and encompass any subset between the upper and lower limits. Some of the lower limits listed may be greater than some of the listed upper limits.

One skilled in the art will recognize that the selected subset may require the selection of an upper limit in excess of the selected lower limit. Therefore, it is to be understood that every range of values is encompassed within the broader range of values. For example, the concentration of the acid swellable polymer in the spacer fluid may be about 0.5% (v/v) of the spacer fluid, about 1% (v/v) of the spacer fluid, about 3% (v/v) of the spacer fluid, about 5% (v/v) of the spacer fluid, about 7% (v/v) of the spacer fluid, about 10% (v/v) of the spacer fluid, about 15% (v/v) of the spacer fluid, about 20% (v/v) of the spacer fluid, about 25% (v/v) of the spacer fluid, or about 30% (v/v) or greater of the spacer fluid. With the benefit of this disclosure, one of ordinary skill in the art will be readily able to obtain and prepare a spacer fluid comprising the acid swellable polymer for a given application.

Examples of cross-linkers used to cross-link the acid swellable polymer include, but are not limited to, EGDMA, ethylene glycol diacrylate, trimethylolpropane triacrylate, trimethylolpropane trimethacrylate, tetraethylene glycol diacrylate, tetraethylene glycol dimethacrylate, pentaerythritol triacrylate, pentaerythritol trimethacrylate, pentaerythritol tetraacrylate, pentaerythritol tetramethacrylate, divinyl benzene, or any other divinyl, trivinyl or tetravinyl crosslinkers, derivatives thereof, or combinations thereof. In all examples, the acid swellable polymer should be cross-linked to a sufficient degree to prevent dissolution of the acid swellable polymer in the spacer fluid so that the salt of the acid swellable polymer gels instead of dissolving. With the benefit of this disclosure, one of ordinary skill in the art will be readily able to cross-link the acid swellable polymer to a sufficient degree for a given application.

Generally, the hydrolysable esters described herein may undergo hydrolysis to provide an acid and an alcohol. As the acid formed from hydrolysis of the hydrolysable esters initiates the salt formation reaction with the acid swellable polymer, the hydrolysable ester may be provided based on the temperature under which the hydrolysable ester may hydrolyze. As such, the hydrolysable ester may not be hydrolyzed prematurely at lower temperatures insufficient for building annular pressure. Preferably, the hydrolysable ester will undergo hydrolysis at a temperature in a range of between about 100° F. to about 400° F. In examples, the hydrolysable ester may provide an organic acid upon hydrolysis. The organic acid may be any acid sufficient for forming a salt with the acid swellable polymer. Beneficially, the hydrolysis of the hydrolysable ester consumes a molecule of water, resulting in a net reduction of water in the system and extra volume for thermal expansion of the remainder of the spacer fluid.

Generally, examples of the hydrolysable ester include, but are not limited to, any organic ester (e.g., diethylene glycol diformate) formed by the combination of a carboxylic acid such as acetic acid, formic acid, lactic acid, etc. and an alcohol With the benefit of this disclosure, one of ordinary skill in the art will be readily able to select a hydrolysable ester for a given application.

The hydrolysable ester may be included in the spacer fluid in an amount sufficient to generate a sufficient concentration of acid in the spacer fluid. That is, the hydrolysable ester should be present in the spacer fluid such that a sufficient amount of acid is formed to provide a sufficient amount of salt from the reaction with the acid swellable polymer. The concentration of the hydrolysable ester in the spacer fluid may range from about 5% (v/v) of the spacer fluid to about 50% (v/v) of the spacer fluid. The concentration of the hydrolysable ester in the spacer fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the hydrolysable ester in the spacer fluid may be about 5% (v/v) of the spacer fluid, about 10% (v/v) of the spacer fluid, about 15% (v/v) of the spacer fluid, about 20% (v/v) of the spacer fluid, about 25% (v/v) of the spacer fluid, about 30% (v/v) of the spacer fluid, about 35% (v/v) of the spacer fluid, about 40% (v/v) of the spacer fluid, about 45% (v/v) of the spacer fluid, or about 50% (v/v) or greater of the spacer fluid. With the benefit of this disclosure, one of ordinary skill in the art will be readily able to obtain and prepare a spacer fluid comprising the hydrolysable ester for a given application.

The spacer fluids described herein comprise an aqueous base fluid, for example, freshwater, saltwater (e.g., water containing one or more salts dissolved therein), brine (e.g., saturated saltwater produced from subterranean formations), seawater, or any combination thereof. Generally, the aqueous base fluid may be from any source, provided that the aqueous base fluid does not contain an excess of compounds that may undesirably affect other components in the spacer fluid. In the case of brines, the aqueous base fluid may comprise a monovalent brine or a divalent brine. Suitable monovalent brines may include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like. One of ordinary skill in the art, with the benefit of this disclosure, should be readily able to select an aqueous base fluid for a chosen application.

A wide variety of additional additives may be included in the spacer fluids as deemed appropriate by one skilled in the art, with the benefit of this disclosure. Examples of such additives include, but are not limited to: cementitious materials, weighting agents, viscosifying agents (e.g., clays, hydratable polymers, guar gum), fluid loss control additives, lost circulation materials, filtration control additives, dispersants, foaming additives, defoaming additives, corrosion inhibitors, scale inhibitors, formation conditioning agents, and water-wetting surfactants. Water-wetting surfactants may be used to aid in removal of oil from surfaces in the wellbore (e.g., the casing) to enhance cement bonding. Examples of suitable weighting agents include, for example, materials having a specific gravity of 2 or greater, such as barite. Specific examples of these, and other, additives include: organic polymers, biopolymers, latex, ground rubber, surfactants, crystalline silica, amorphous silica, silica flour, fumed silica, nano-clays (e.g., clays having at least one dimension less than 100 nm), salts, fibers, hydratable clays, microspheres, rice husk ash, micro-fine cement (e.g., cement having an average particle size of from about 5 microns to about 10 microns), metakaolin, zeolite, shale, Portland cement, Portland cement interground with pumice, perlite, barite, slag, lime (e.g., hydrated lime), gypsum, and any combinations thereof, and the like. A person having ordinary skill in the art, with the benefit of this disclosure, should be readily able to determine the type and amount of additive useful for a particular application and desired result.

The spacer fluids generally should have a density suitable for a particular application as desired by those of ordinary skill in the art, with the benefit of this disclosure. In some examples, the spacer fluids may have a density in the range of from about 4 pounds per gallon (hereafter "ppg") to about 24 ppg. In other examples, the spacer fluids may have a density in the range of about 4 ppg to about 17 ppg. In yet other examples, the spacer fluids may have a density in the range of about 8 ppg to about 13 ppg. Examples of the spacer fluids may be foamed or unfoamed or comprise other means to reduce their densities known in the art, such as lightweight additives. Those of ordinary skill in the art, with the benefit of this disclosure, should recognize the appropriate density for a particular application and be readily able to produce a spacer fluid having said density.

Example systems may comprise a pump fluidly coupled to a tubular, the tubular containing an example spacer fluid as described herein. The pump may be a high-pressure pump or a low-pressure pump. As used herein, the term "high pressure pump" will refer to a pump that is capable of delivering a fluid downhole at a pressure of about 1000 psi or greater. Suitable high-pressure pumps will be known to one having ordinary skill in the art and may include, but are not limited to, floating piston pumps and positive displacement pumps. In other examples, the pump may be a low-pressure pump. As used herein, the term "low pressure pump" will refer to a pump that operates at a pressure of about 1000 psi or less. Suitable low-pressure pumps will be known to one having ordinary skill in the art.

In some examples, the systems described herein may further comprise a mixing tank that is upstream of the pump and is the vessel in which the spacer fluid is formulated. In various examples, the pump (e.g., a low-pressure pump, a high-pressure pump, or a combination thereof) may convey the spacer fluid from the mixing tank to the transporting conduit. In other examples, the spacer fluid may be formulated offsite and transported to a worksite, in which case the spacer fluid may be introduced to the transporting conduit via the pump either directly from its shipping container (e.g., a truck, a railcar, a barge, or the like) or from a transport pipeline. In either case, the spacer fluid may be drawn into the pump, elevated to an appropriate pressure, and then introduced into the transporting conduit for delivery downhole.

When desired for use, the acid swellable polymer and the hydrolysable ester may be added to the aqueous base fluid of the spacer fluid to provide the spacer fluid. The spacer fluid may be introduced into a wellbore to perform a displacement operation. Should any portion of the spacer fluid remain in the wellbore annulus during production when the produced hydrocarbons may transfer heat through the casing and into the annular space, the temperature-dependent hydrolytic cleavage of the hydrolysable ester will consume a molecule of the more thermally expansive water and produce an acid which may react with the acid swellable polymer to produce a less thermally expansive salt. The salt may form a non-dissolvable hydrogel and absorb water within its structure, resulting in a less thermally expansive solid that mitigates the annular pressure buildup occurring from increasing annular temperature.

As described herein, the spacer fluid may be used to displace a first fluid (e.g., a drilling fluid) and prevent a second fluid (e.g., a cement composition) from contacting the first fluid. The spacer fluid may also displace the first fluid and/or filter cake solids from the wellbore in advance of the second fluid. Embodiments of the spacer fluid may improve the efficiency of the removal of these and other fluids from the wellbore. Removal of these fluids from the wellbore may enhance bonding of the second fluid (e.g., a cement composition) to surfaces in the wellbore.

In some examples, the displaced first fluid is a drilling fluid. The displaced drilling fluid may include, for example, any number of fluids, such as solid suspensions, mixtures, and emulsions. In some examples, the drilling fluid is an aqueous-based drilling fluid. In some other examples, the drilling fluid may comprise an oil-based drilling fluid. An example of a suitable oil-based drilling fluid comprises an invert emulsion. In some examples, the oil-based drilling fluid may comprise an oleaginous fluid. Examples of suitable oleaginous fluids that may be included in the oil-based drilling fluids include, but are not limited to, α-olefins, internal olefins, alkanes, aromatic solvents, cycloalkanes, liquefied petroleum gas, kerosene, diesel oils, crude oils, gas oils, fuel oils, paraffin oils, mineral oils, low-toxicity mineral oils, olefins, esters, amides, synthetic oils (e.g., polyolefins), polydiorganosiloxanes, siloxanes, organosiloxanes, ethers, acetals, dialkylcarbonates, hydrocarbons, and combinations thereof.

In some examples, the second fluid is a cement composition. The cement composition introduced may comprise hydraulic cement and water. In some examples, kiln dust may be used in place of some (e.g., up to about 50% by weight or more) or all of the hydraulic cement. A variety of hydraulic cements may be utilized, including, but not limited to, those comprising calcium, aluminum, silicon, oxygen, iron, and/or sulfur, which set and harden by reaction with water. Suitable hydraulic cements include, but are not limited to, Portland cements, pozzolana cements, gypsum cements, high alumina content cements, slag cements, silica cements, and combinations thereof. In certain examples, the hydraulic cement may comprise a Portland cement. In some examples, the Portland cements may include cements classified as Classes A, C, H, or G cements according to American Petroleum Institute, API Specification for Materials and Testing for Well Cements, API Specification 10, Fifth Ed., Jul. 1, 1990. In addition, in some examples, the hydraulic cement may include cements classified as ASTM Type I, II, or III.

Figure 1:
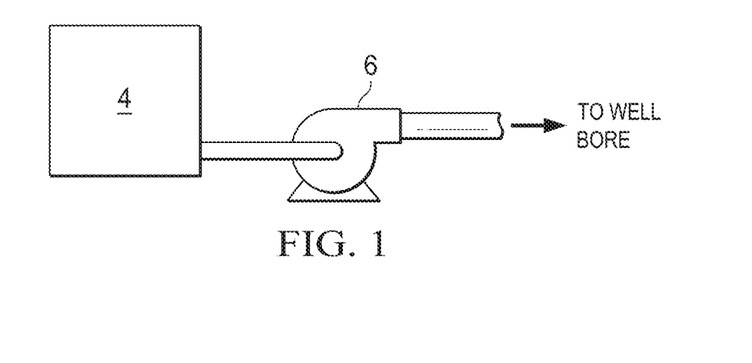
FIG. 1 is a schematic illustrating mixing and pumping equipment used in the preparation of a spacer fluid in accordance with the examples disclosed herein.

Referring now to FIG. 1, a schematic illustrating mixing and pumping equipment for the preparation of a spacer fluid comprising the acid swellable polymer and the hydrolysable ester is illustrated in accordance with the examples disclosed herein. FIG. 1 illustrates a system 2 for preparation of a spacer fluid comprising the acid swellable polymer and the hydrolysable ester. The acid swellable polymer and the hydrolysable ester may be added to an aqueous base fluid along with any spacer fluid additives and mixed in mixing equipment 4 to provide a spacer fluid. Mixing equipment 4 may be any mixer sufficient for mixing the components of the spacer fluid composition. Examples of mixing equipment 4 may include, but are not limited to, a jet mixer, re-circulating mixer, a batch mixer, and the like. In some examples, mixing equipment 4 may be a jet mixer and may continuously mix the spacer fluid as it is pumped to the wellbore. The acid swellable polymer may be added to mixing equipment 4 first or, alternatively, the hydrolysable ester may be added to mixing equipment 4 first. In some examples, the spacer fluid may be formulated in mixing equipment 4 such that the components of the spacer fluid, including the acid swellable polymer and the hydrolysable ester, may be added to the mixing equipment 4 in any order and mixed to provide the desired spacer fluid formulation.

After the spacer fluid has been mixed in mixing equipment 4, the spacer fluid may be pumped to the wellbore via pumping equipment 6. In some examples, the mixing equipment 4 and the pumping equipment 6 may be disposed on one or more cement trucks as will be apparent to those of ordinary skill in the art. Examples of pumping equipment 6 include, but are not limited to, floating piston pumps, positive displacement pumps, centrifugal pumps, peristaltic pumps, and diaphragm pumps.

Figure 2:
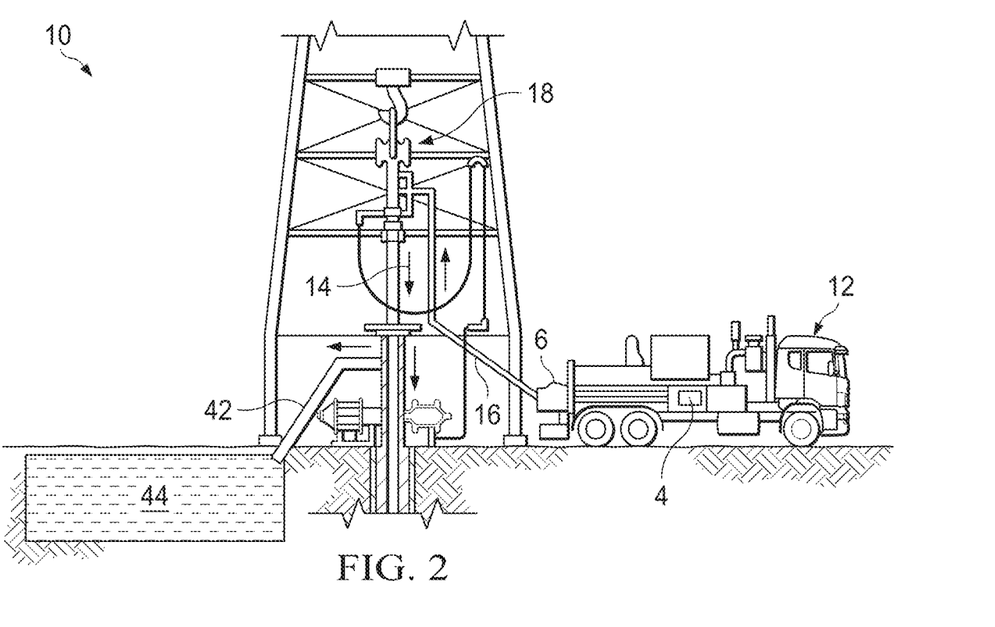
FIG. 2 is a schematic illustrating surface equipment used for the placement of a spacer fluid in accordance with the examples disclosed herein.

FIG. 2 is a schematic illustrating surface equipment 10 used for the placement of a spacer fluid 14 comprising an acid swellable polymer and hydrolysable ester in accordance with the examples disclosed herein. It should be noted that while FIG. 2 generally depicts a land-based operation, those skilled in the art will readily recognize that the principles described herein are equally applicable to subsea operations that employ floating or sea-based platforms and rigs without departing from the scope of the disclosure. As illustrated, the surface equipment 10 may include a cementing unit 12, which may include one or more cement trucks. The cementing unit 12 may include mixing equipment 4 and pumping equipment 6 as will be apparent to those of ordinary skill in the art. The cementing unit 12 may pump a spacer fluid 14 through feed pipe 16 and to a cementing head 18, which conveys the spacer fluid 14 downhole into a wellbore. Any of the embodiments of a spacer fluid described herein may apply in the context of FIG. 2 with respect to the spacer fluid 14. For example, the spacer fluid 14 may comprise any of the acid swellable polymers and hydrolysable esters described herein, and optionally, any of the spacer fluid additives described herein.

An example of using a spacer fluid 14 comprising an acid swellable polymer and hydrolysable ester will now be described with reference to FIG. 3. Any of the examples of a spacer fluid described herein may apply in the context of FIG. 3 with respect to the spacer fluid 14. For example, the spacer fluid 14 may comprise any of the acid swellable polymers and hydrolysable esters described herein, and optionally, any of the spacer fluid additives described herein.

Figure 3:
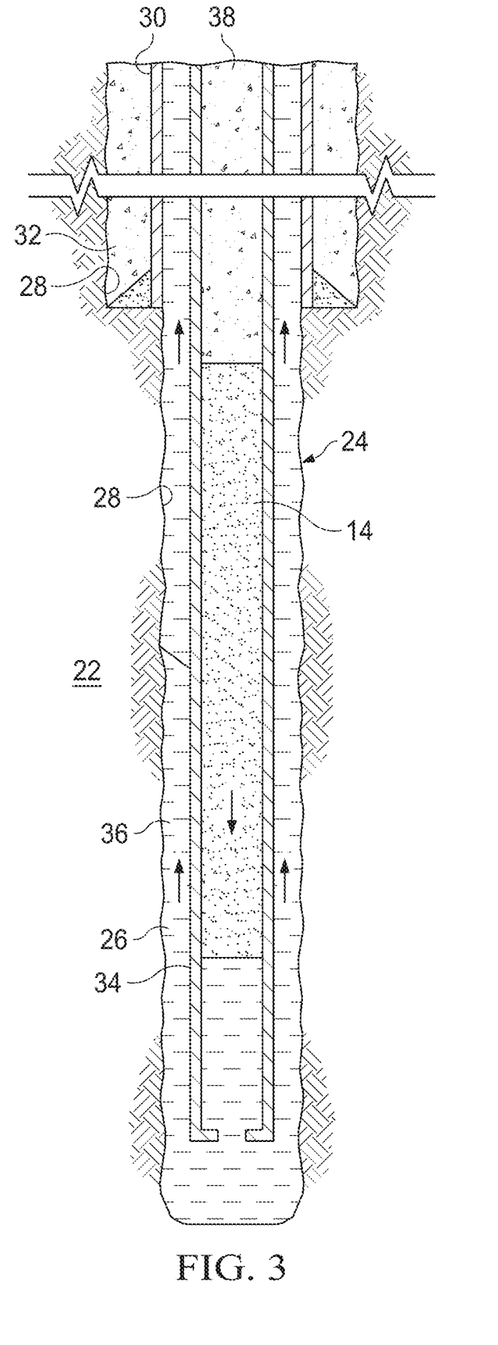
FIG. 3 is a cross-section illustrating the use of a spacer fluid to displace a first fluid from a wellbore annulus in accordance with the examples disclosed herein.

FIG. 3 is a cross-section illustrating the use of a spacer fluid 14 to displace a first fluid 26 from a wellbore annulus 36 in accordance with the examples disclosed herein. FIG. 3 depicts one or more subterranean formations 22 penetrated by a wellbore 24 with first fluid 26 (e.g., a drilling fluid) disposed therein. The first fluid 26 may comprise any of the drilling fluids disclosed herein as well as any other suitable well and/or treatment fluid that would be readily apparent to those of ordinary skill in the art. While the wellbore 24 is shown extending generally vertically into the one or more subterranean formations 22, the principles described herein are also applicable to wellbores that extend at an angle through the one or more subterranean formations 22, such as horizontal and slanted wellbores. As illustrated, the wellbore 24 comprises walls 28. In the illustrated embodiment, a surface casing 30 has been cemented to the walls 28 of the wellbore 24 by cement sheath 32. In the illustrated embodiment, one or more additional pipe strings (e.g., intermediate casing, production casing, liners, etc.), shown here as casing 34, may also be disposed in the wellbore 24. As illustrated, there is a wellbore annulus 36 formed between the casing 34 and the walls 28 of the wellbore 24 (and/or the surface casing 30). While not shown, one or more centralizers may be attached to the surface casing 30, for example, to centralize the casing 34 in the wellbore 24 prior to and during any wellbore operations.

The spacer fluid 14 may be introduced to the wellbore 24 and used to separate the first fluid 26 from a second fluid 38 (discussed below). The previous embodiments described with reference to FIG. 1 for preparation of the spacer fluid 14 may be used for delivery of the spacer fluid 14 into the wellbore 24. Moreover, the pumping equipment 6 shown on FIGS. 1 and 2 may also be used for delivery of the spacer fluid 14 into the wellbore 24. The spacer fluid 14 may be used to displace the first fluid 26 from the wellbore 24 and to prepare the wellbore 24 for the second fluid 38. By way of example, the spacer fluid 14 may function, inter alia, to remove the first fluid 26 and/or filter cake solids from the wellbore 24 in advance of the second fluid 38. While not shown, one or more plugs or other suitable devices may be used to physically separate the first fluid 26 from the spacer fluid 14 and/or the spacer fluid 14 from the second fluid 38.

As illustrated, the second fluid 38 (e.g., a cement composition) may be introduced into the wellbore 24. For example, the second fluid 38 may be pumped down the interior of the casing 34. The pumping equipment 6 shown on FIGS. 1 and 2 may be used for delivery of the second fluid 38 into the wellbore 24. It may be desired to circulate the second fluid 38 in the wellbore 24 until it is in the wellbore annulus 36. The second fluid 38 may include the example cement compositions disclosed herein as well as any other suitable well and/or treatment fluids that would be readily apparent to those of ordinary skill in the art. While not illustrated, other techniques may also be utilized for introduction of the second fluid 38, for example, reverse circulation techniques and the like.

Figure 4:
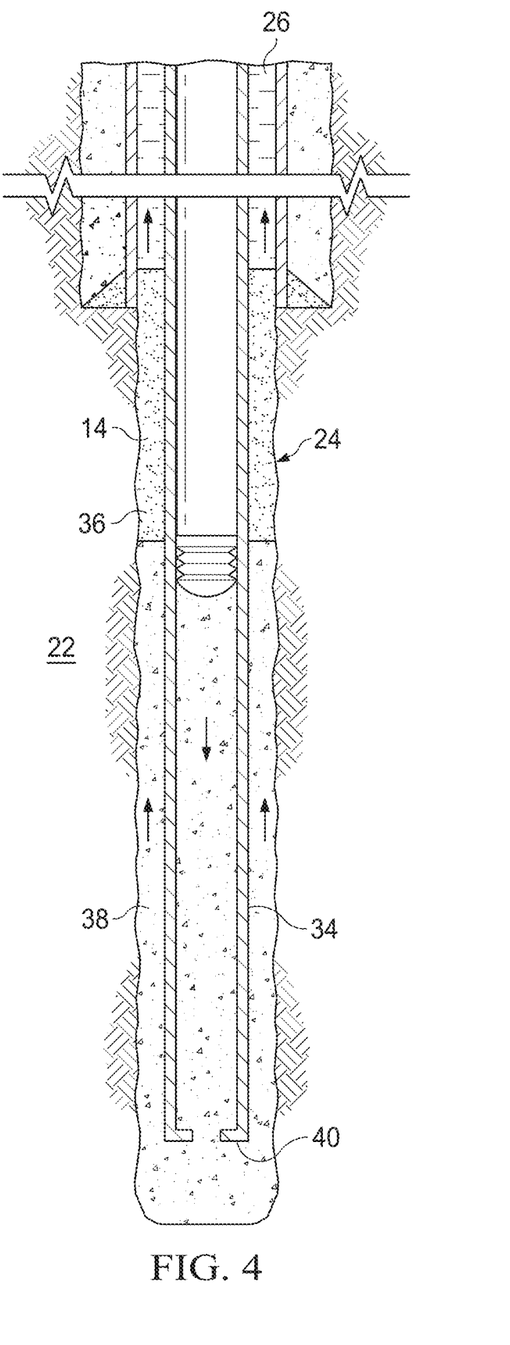
FIG. 4 is a cross-section further illustrating the displacement of a first fluid from the wellbore annulus using a spacer fluid in accordance with examples disclosed herein.

FIG. 4 is a cross-section further illustrating the displacement of a first fluid 26 from the wellbore annulus 36 using the spacer fluid 14 in accordance with examples disclosed herein. Referring now to FIG. 4, a portion of the first fluid 26 has been displaced from the wellbore annulus 36 in accordance with the described example of FIG. 3. As illustrated, the spacer fluid 14 and the second fluid 38 may be allowed to flow down the interior of the casing 34 through the bottom of the casing 34 (e.g., casing shoe 40) and up around the casing 34 into the wellbore annulus 36, thus displacing the first fluid 26. At least a portion of the displaced first fluid 26 may exit the wellbore annulus 36 via a flow line 42 and be deposited, for example, in one or more retention pits 44 (e.g., a mud pit), as shown in FIG. 2. Turning back to FIG. 4, the second fluid 38 may continue to be circulated until it has reached a desired location in the wellbore annulus 36. A portion of the spacer fluid 14 may become trapped in the wellbore annulus 36 above the top of the second fluid 38 and may be left in the wellbore annulus 36. As illustrated, the spacer fluid 14 may be disposed in the wellbore annulus 36 above or on top of the second fluid 38. In examples where the second fluid 38 is a cement composition, the second fluid 38 may set in the wellbore annulus 36 to form an annular sheath of hardened, substantially impermeable material (i.e., a cement sheath) that may support and position the casing 34 in the wellbore 24. As previously mentioned, examples of the spacer fluid 14 may remain in the wellbore annulus 36 throughout production. Produced oil and gas may transfer heat through the casing 34 and into the wellbore annulus 36. The increased temperature in wellbore annulus 36 may result in a buildup of annular pressure in wellbore annulus 36. The increase in temperature in the wellbore annulus 36 may also result in the temperature-dependent hydrolytic cleavage of the hydrolysable ester in spacer fluid 14. This hydrolysis reaction will consume a molecule of the more thermally expansive water of the aqueous base fluid of spacer fluid 14 and yield an acid which may react with the acid swellable polymer to produce a less thermally expansive salt. The salt may form a non-dissolvable hydrogel and absorb the water of the aqueous base fluid of spacer fluid 14 within its structure, resulting in a less thermally expansive solid that mitigates the described annular pressure buildup occurring from increasing annular temperature within wellbore annulus 36.

It should be clearly understood that the examples illustrated by FIGS. 1-4 are merely general applications of the principles of this disclosure in practice, and a wide variety of other examples are possible. Therefore, the scope of this disclosure is not limited in any manner to the details of FIGS. 1-4 described herein.

It is also to be recognized that the disclosed spacer fluids may also directly or indirectly affect the various downhole equipment and tools that may come into contact with the spacer fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIGS. 1-4.

Provided are methods for mitigating annular pressure buildup in a wellbore in accordance with the disclosure and the illustrated FIGs. An example method comprises introducing a spacer fluid into an annulus of the wellbore, wherein the spacer fluid comprises an aqueous base fluid, an acid swellable polymer, and a hydrolysable ester; allowing or causing to allow at least a portion of the spacer fluid to remain in the annulus; and allowing or causing to allow a temperature to increase in the annulus to the temperature sufficient to hydrolyze the hydrolysable ester; wherein hydrolysis of the hydrolysable ester produces an acid; wherein the acid reacts with the acid swellable polymer to produce a salt; and wherein the produced salt has a thermal expansion coefficient less than that of the aqueous base fluid. The acid swellable polymer may be a copolymer comprising two monomers selected from the group consisting of: alkyl acrylates, alkyl methacrylates, cyclohexyl acrylates, cyclohexyl methacrylates, aryl acrylates, aryl methacrylates, aminoalkyl acrylates, aminoalkyl methacrylates, alkyl vinyl ethers, styrene, acrylonitrile, 2-vinyl pyridine, 4-vinyl pyridine, vinyl acetate, alkane diol diacrylates, alkane diol dimethacrylates, alkene glycol diacrylates, alkene glycol dimethacrylates, alkane diol divinyl ethers, alkene glycol divinylethers, divinylbenzene, allyl methacrylate, allyl acrylate, triacrylates, trimethylolpropane triacrylate, trimethacrylates, trimethylolpropane trimethacrylate, N, N-dimethylaminoethyl methacrylate, and any combination thereof. In a specific example, the two monomers are N, N-dimethylaminoethyl methacrylate and styrene. The acid swellable polymer may be cross-linked with a cross-linker selected from the group consisting of: EGDMA, ethylene glycol diacrylate, trimethylolpropane triacrylate, trimethylolpropane trimethacrylate, tetraethylene glycol diacrylate, tetraethylene glycol dimethacrylate, pentaerythritol triacrylate, pentaerythritol trimethacrylate, pentaerythritol tetraacrylate, pentaerythritol tetramethacrylate, divinyl benzene, and any combination thereof. The acid swellable polymer may comprise N, N-dimethylaminoethyl methacrylate in a range of from about 75 mole % to about 95 mole % and styrene in a range of from about 5 mole % to about 25 mole %; and wherein the acid swellable polymer is further cross-linked by ethylene glycol dimethacrylate, and the ethylene glycol dimethacrylate is present in the acid swellable polymer in a range of from about 1 mole % to about 5 mole %. The acid swellable polymer may be present in a concentration in the spacer fluid in a range of about 0.5% (v/v) to about 30% (v/v). The hydrolysable ester may be diethylene glycol diformate. The hydrolysable ester may be present in a concentration in the spacer fluid in a range of about 5% (v/v) to about 50% (v/v). The hydrolysable ester may hydrolyze at a temperature in a range of about 100° F. to about 400° F. The method may further comprise displacing at least a portion of a first fluid from the annulus with the spacer fluid; and introducing a second fluid into the annulus after introducing the spacer fluid into the annulus. The annulus may comprise an annular pressure; and wherein the annular pressure may be less than a casing collapse pressure of a casing adjacent to the annulus after formation of the salt.

Provided are compositions for mitigating annular pressure buildup in a wellbore in accordance with the disclosure and the illustrated FIGs. An example composition comprises a spacer fluid comprising an aqueous base fluid, an acid swellable polymer, and a hydrolysable ester. The acid swellable polymer may be a copolymer comprising two monomers selected from the group consisting of: alkyl acrylates, alkyl methacrylates, cyclohexyl acrylates, cyclohexyl methacrylates, aryl acrylates, aryl methacrylates, aminoalkyl acrylates, aminoalkyl methacrylates, alkyl vinyl ethers, styrene, acrylonitrile, 2-vinyl pyridine, 4-vinyl pyridine, vinyl acetate, alkane diol diacrylates, alkane diol dimethacrylates, alkene glycol diacrylates, alkene glycol dimethacrylates, alkane diol divinyl ethers, alkene glycol divinylethers, divinylbenzene, allyl methacrylate, allyl acrylate, triacrylates, trimethylolpropane triacrylate, trimethacrylates, trimethylolpropane trimethacrylate, N, N-dimethylaminoethyl methacrylate, and any combination thereof. In a specific example, the two monomers are N, N-dimethylaminoethyl methacrylate and styrene. The acid swellable polymer may be cross-linked with a cross-linker selected from the group consisting of: EGDMA, ethylene glycol diacrylate, trimethylolpropane triacrylate, trimethylolpropane trimethacrylate, tetraethylene glycol diacrylate, tetraethylene glycol dimethacrylate, pentaerythritol triacrylate, pentaerythritol trimethacrylate, pentaerythritol tetraacrylate, pentaerythritol tetramethacrylate, divinyl benzene, and any combination thereof. The acid swellable polymer may comprise N, N-dimethylaminoethyl methacrylate in a range of from about 75 mole % to about 95 mole % and styrene in a range of from about 5 mole % to about 25 mole %; and wherein the acid swellable polymer is further cross-linked by ethylene glycol dimethacrylate, and the ethylene glycol dimethacrylate is present in the acid swellable polymer in a range of from about 1 mole % to about 5 mole %. The acid swellable polymer may be present in a concentration in the spacer fluid in a range of about 0.5% (v/v) to about 30% (v/v). The hydrolysable ester may be diethylene glycol diformate. The hydrolysable ester may be present in a concentration in the spacer fluid in a range of about 5% (v/v) to about 50% (v/v). The hydrolysable ester may hydrolyze at a temperature in a range of about 100° F. to about 400° F. The spacer fluid may be used to displace at least a portion of a first fluid from the annulus with the spacer fluid. A second fluid may be introduced into the annulus after introducing the spacer fluid into the annulus. The annulus may comprise an annular pressure; and wherein the annular pressure may be less than a casing collapse pressure of a casing adjacent to the annulus after formation of the salt.

Provided are systems for mitigating annular pressure buildup in a wellbore in accordance with the disclosure and the illustrated FIGs. An example system comprises a spacer fluid comprising: an aqueous base fluid, an acid swellable polymer, and a hydrolysable ester; and mixing equipment capable of mixing the aqueous base fluid, acid swellable polymer, and hydrolysable ester to provide the spacer fluid; and pumping equipment capable of delivering the spacer fluid into an annulus of a wellbore. The acid swellable polymer may be a copolymer comprising two monomers selected from the group consisting of: alkyl acrylates, alkyl methacrylates, cyclohexyl acrylates, cyclohexyl methacrylates, aryl acrylates, aryl methacrylates, aminoalkyl acrylates, aminoalkyl methacrylates, alkyl vinyl ethers, styrene, acrylonitrile, 2-vinyl pyridine, 4-vinyl pyridine, vinyl acetate, alkane diol diacrylates, alkane diol dimethacrylates, alkene glycol diacrylates, alkene glycol dimethacrylates, alkane diol divinyl ethers, alkene glycol divinylethers, divinylbenzene, allyl methacrylate, allyl acrylate, triacrylates, trimethylolpropane triacrylate, trimethacrylates, trimethylolpropane trimethacrylate, N, N-dimethylaminoethyl methacrylate, and any combination thereof. In a specific example, the two monomers are N, N-dimethylaminoethyl methacrylate and styrene. The acid swellable polymer may be cross-linked with a cross-linker selected from the group consisting of: EGDMA, ethylene glycol diacrylate, trimethylolpropane triacrylate, trimethylolpropane trimethacrylate, tetraethylene glycol diacrylate, tetraethylene glycol dimethacrylate, pentaerythritol triacrylate, pentaerythritol trimethacrylate, pentaerythritol tetraacrylate, pentaerythritol tetramethacrylate, divinyl benzene, and any combination thereof. The acid swellable polymer may comprise N, N-dimethylaminoethyl methacrylate in a range of from about 75 mole % to about 95 mole % and styrene in a range of from about 5 mole % to about 25 mole %; and wherein the acid swellable polymer is further cross-linked by ethylene glycol dimethacrylate, and the ethylene glycol dimethacrylate is present in the acid swellable polymer in a range of from about 1 mole % to about 5 mole %. The acid swellable polymer may be present in a concentration in the spacer fluid in a range of about 0.5% (v/v) to about 30% (v/v). The hydrolysable ester may be diethylene glycol diformate. The hydrolysable ester may be present in a concentration in the spacer fluid in a range of about 5% (v/v) to about 50% (v/v). The hydrolysable ester may hydrolyze at a temperature in a range of about 100° F. to about 400° F. The spacer fluid may be used to displace at least a portion of a first fluid from the annulus with the spacer fluid. A second fluid may be introduced into the annulus after introducing the spacer fluid into the annulus. The annulus may comprise an annular pressure; and wherein the annular pressure may be less than a casing collapse pressure of a casing adjacent to the annulus after formation of the salt.

EXAMPLES

The present disclosure may be better understood by reference to the following examples, which are offered by way of illustration. The present disclosure is not limited to the examples provided herein.

Example 1

Figure 5A:
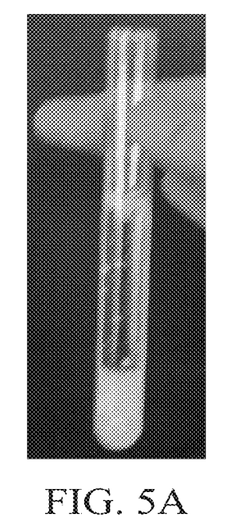
FIG. 5A is a photograph illustrating an example acid swellable polymer and hydrolysable ester mixture after addition of the acid swellable polymer to a hydrolysable ester solution in accordance with examples disclosed herein.
Figure 5B:
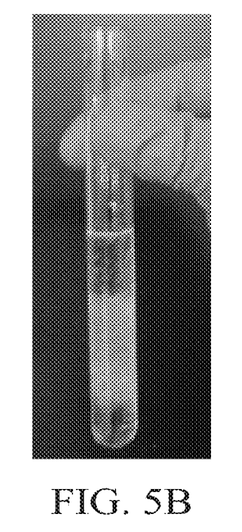
FIG. 5B is a photograph illustrating the acid swellable polymer and hydrolysable ester mixture of FIG. 5A after one hour in accordance with examples disclosed herein.
Figure 5C:
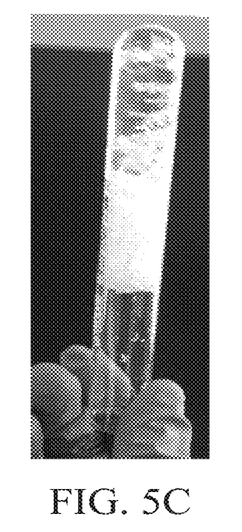
FIG. 5C is a photograph illustrating the completed swelling of the acid swellable polymer in the acid swellable polymer and hydrolysable ester mixture of FIGS. 5A and 5B in accordance with examples disclosed herein.

Example 1 illustrates a proof-of-concept experiment to test the swelling of the acid swellable polymer in the presence of hydrolysable esters. An example acid swellable polymer comprising a monomer pair of DMAEMA and styrene, and cross-linked with EDGMA, was added to a 38% hydrolysable ester solution of diethylene glycol diformate. The polymer behavior was observed over time at 150° F. FIG. 5A is a picture illustrating the acid swellable polymer and hydrolysable ester mixture after addition of the acid swellable polymer to the hydrolysable ester solution. FIG. 5B is a picture illustrating the acid swellable polymer and hydrolysable ester mixture after one hour. As illustrated, ester hydrolysis has begun and the acid swellable polymer has begun to swell. FIG. 5C is a picture illustrating the completed swelling of the acid swellable polymer which has absorbed a significant portion of the water and trapped the remaining portion in the bottom of the test tube.

Example 2

Example 2 illustrates a comparative experiment to test pressure buildup in four different closed spacer fluid systems after increasing the temperature in said systems. Fluid System 1 has a density of 10 ppg and comprised 81.6% by volume of an aqueous spacer fluid comprising vitrified shale, sepiolite, and diatomaceous earth; 14.4% by volume hydrolysable ester (i.e., diethylene glycol formate); and 4% by volume acid swellable polymer (i.e., a copolymer of DMAEMA and styrene, and cross-linked with EDGMA). Fluid System 2 has a density of 10 ppg and comprised 85% by volume of an aqueous spacer fluid comprising vitrified shale, sepiolite, and diatomaceous earth; 15% by volume hydrolysable ester (i.e., diethylene glycol formate), and 0% by volume acid swellable polymer. Fluid System 3 has a density of 8.65 ppg and comprised 81.6% by volume water, 14.4% by volume hydrolysable ester (i.e., diethylene glycol formate), and 4% by volume acid swellable polymer (i.e., a copolymer of DMAEMA and styrene, and cross-linked with EDGMA). Fluid System 4 has a density of 8.6 ppg and comprised 85% by volume water, 15% by volume hydrolysable ester (i.e., diethylene glycol formate), and 0% by volume acid swellable polymer.

Figure 6:
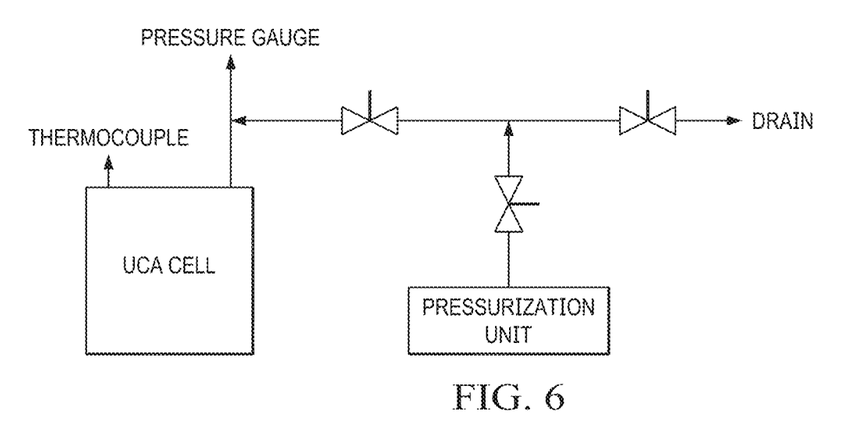
FIG. 6 is a schematic of an ultrasonic cement analyzer set-up for an experiment conducted in accordance with the examples disclosed herein.

The experiments were carried out using a Fann® ultrasonic cement analyzer (hereafter "UCA"). FANN® is a registered trademark of Halliburton Energy Services, Inc. The set-up and schematic diagram of the Fann® UCA is illustrated in FIG. 6. The following procedure was used to carry out the testing:

1. The prepared spacer fluids (i.e., Fluid Systems 1-4) were conditioned at 130° F. for 30 min. This was done to simulate the pumping of the spacer fluid in the wellbore.

2. The conditioned spacer fluids were then poured into a preheated UCA cell.

3. The UCA cell was then manually pressurized to 3000 psi with a temperature of 130° F. This simulates the placement of the spacer fluids at downhole conditions.

4. The UCA cell was isolated from the pressurization unit. (Locked the pressure)

5. The temperature in the UCA cell was then increased from 130° F. to 210° F. (i.e., a ΔT of 80° F.) in 30 minutes and the increase in pressure was recorded. The difference in the initial pressure (3000 psi at 130° F.) and the final pressure at 210° F. is the ΔP.

6. The cell was then cooled to 130° F. This completed the first cycle.

7. Steps 5 and 6 were repeated for another two cycles that are referred to as cycles 2 and 3 respectively. The results of all three cycles are listed in Table 1 below:

TABLE 1

| ΔP for Fluid Systems 1-4 | | | | |
|---|---|---|---|---|
| Cycle | ΔP in psi | | | |
| No. | Fluid System 1 | Fluid System 2 | Fluid System 3 | Fluid System 4 |
| 1 | 2750 | 7000 | 3000 | 8250 |
| 2 | 2500 | 6900 | 2750 | 8000 |
| 3 | 2500 | 6800 | 2700 | 8000 |

The results illustrate a decrease of about 4,000 psi in pressure buildup during increasing temperature for fluid system 1 and a decrease of about 5,000 psi for Fluid System 3. This difference in pressure buildup may be the difference between collapsing the casing and maintaining casing integrity. For example, a 9⅝ inch, 53.5 lb/ft, P110 casing has a collapse pressure of 7950 psi and a 58.40 lb/ft casing has a collapse pressure of 9760 psi.

Notably, as the temperature is increased from 130° F. to 210° F., the absolute pressure increases to 10,000 psi when the conventional spacer fluid (i.e., Fluid System 2) is used. This increase in pressure could be detrimental to the casing integrity in some examples. However, when the comparable Fluid System 1 is used (Note: Fluid System 1 was the same as Fluid System 2 except for the inclusion of the annular pressure buildup system of the acid swellable polymer and the hydrolysable ester), the pressure increased only to about 5,750 psi when the temperature was increased from 130° F. to 210° F. This reduced increase in pressure may be below the casing collapse pressure and may assist in maintain casing and well integrity during production.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method of mitigating annular pressure buildup in a wellbore, the method comprising:
   introducing a spacer fluid into an annulus of the wellbore, wherein the annulus has an annular temperature, wherein the spacer fluid comprises an aqueous base fluid, an acid swellable polymer, and a hydrolysable ester;
   allowing at least a portion of the spacer fluid to remain in the annulus;
   allowing the annular temperature to increase to a temperature sufficient to hydrolyze the hydrolysable ester; wherein hydrolysis of the hydrolysable ester produces an acid; wherein the acid reacts with the acid swellable polymer to produce a salt; and wherein the produced salt has a thermal expansion coefficient less than that of the aqueous base fluid; wherein the acid swellable polymer is a copolymer comprising two monomers selected from the group consisting of: alkyl acrylates, alkyl methacrylates, cyclohexylacrylates, cyclohexyl methacrylates, aryl acrylates, aryl methacrylates, aminoalkyl acrylates, aminoalkyl methacrylates, alkyl vinyl ethers, styrene, acrylonitrile, 2-vinyl pyridine, 4-vinyl pyridine, vinyl acetate, alkane diol diacrylates, alkane diol dimethacrylates, alkene glycol diacrylates, alkene glycol dimethacrylates, alkane diol divinyl ethers, alkene glycol divinylethers, divinylbenzene, allyl methacrylate, allyl acrylate, triacrylates, trimethylolpropane triacrylate, trimethacrylates, trimethylolpropane trimethacrylate, N,N-dimethylaminoethyl methacrylate, and any combination thereof; wherein at least one monomer of the copolymer comprises an amine functional group; and
   reducing the annular pressure buildup in the annulus, wherein the reduced pressure buildup in the annulus is determined through relative measurement to a comparative spacer fluid that is identical to the introduced spacer fluid except that it does not comprise the acid swellable polymer and the hydrolysable ester.

2. The method of claim 1, wherein the two monomers are N, N-dimethylaminoethyl methacrylate and styrene.

3. The method of claim 1, wherein the acid swellable polymer is cross-linked with a cross-linker selected from the group consisting of: ethylene glycol dimethacrylate, ethylene glycol diacrylate, trimethylolpropane triacrylate, trimethylolpropane trimethacrylate, tetraethylene glycol diacrylate, tetraethylene glycol dimethacrylate, pentaerythritol triacrylate, pentaerythritol trimethacrylate, pentaerythritol tetraacrylate, pentaerythritol tetramethacrylate, divinyl benzene, and any combination thereof.

4. The method of claim 1, wherein the acid swellable polymer comprises N, N-dimethylaminoethyl methacrylate in a range of from about 75 mole % to about 95 mole % and styrene in a range of from about 5 mole % to about 25 mole %; and wherein the acid swellable polymer is further cross-linked by ethylene glycol dimethacrylate, and the ethylene glycol dimethacrylate is present in the acid swellable polymer in a range of from about 1 mole % to about 5 mole %.

5. The method of claim 1, wherein the acid swellable polymer is present in a concentration in the spacer fluid in a range of about 0.5% (v/v) to about 30% (v/v).

6. The method of claim 1, wherein the hydrolysable ester is diethylene glycol diformate.

7. The method of claim 1, wherein the hydrolysable ester is present in a concentration in the spacer fluid in a range of about 5% (v/v) to about 50% (v/v).

8. The method of claim 1, wherein the hydrolysable ester hydrolyzes at a temperature in a range of about 100° F. to about 400° F.

9. The method of claim 1, further comprising displacing at least a portion of a first fluid from the annulus with the spacer fluid; and introducing a second fluid into the annulus after introducing the spacer fluid into the annulus.

10. The method of claim 1, wherein the annulus comprises an annular pressure; and wherein the annular pressure is less than a casing collapse pressure of a casing adjacent to the annulus after formation of the salt.

\* \* \* \* \*